H. W. PLEISTER.
BOLT ANCHOR.
APPLICATION FILED JULY 18, 1911.
1,051,444.
Patented Jan. 28, 1913.
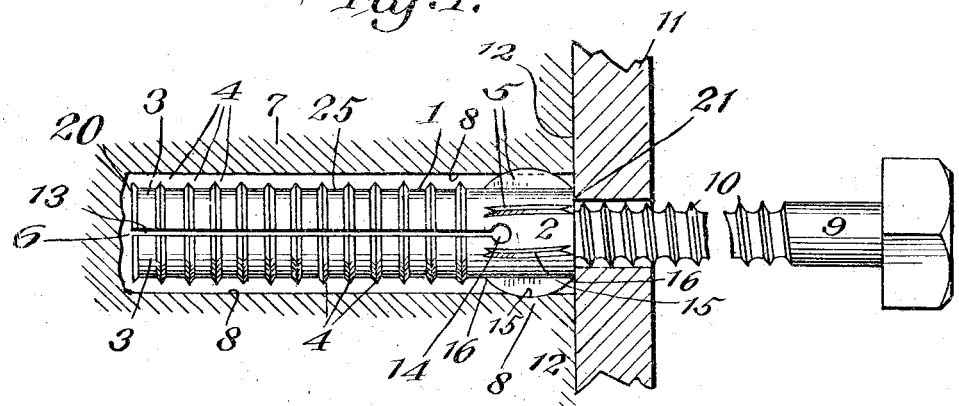
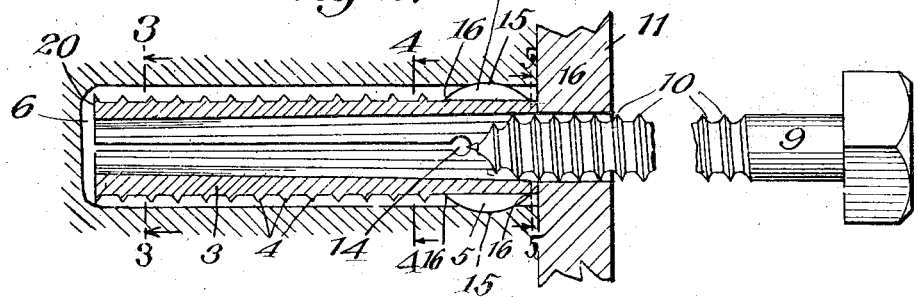
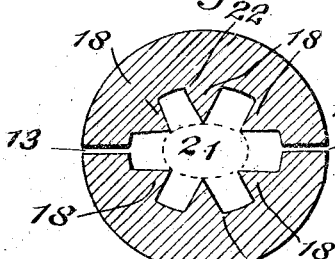 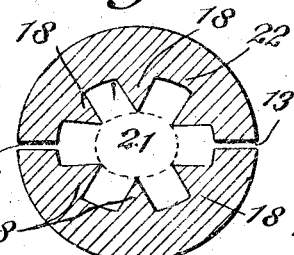 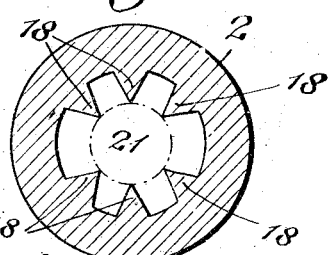
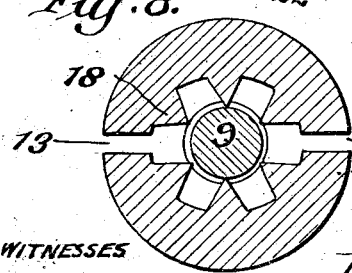 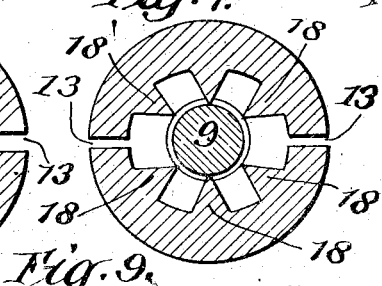 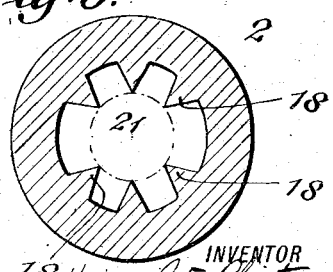
WITNESSES
R. Menk
John D. Morgan
INVENTOR
Henry W. Pleister
BY
Alan M. Johnson
ATTORNEY

UNITED STATES PATENT OFFICE.

HENRY W. PLEISTER, OF WESTFIELD, NEW JERSEY, ASSIGNOR TO HENRY B. NEWHALL, OF PLAINFIELD, NEW JERSEY.

BOLT-ANCHOR.

1,051,444.　　　　Specification of Letters Patent.　　Patented Jan. 28, 1913.

Application filed July 18, 1911.　Serial No. 639,120.

*To all whom it may concern:*

Be it known that I, HENRY W. PLEISTER, a citizen of the United States, and a resident of Westfield, in the county of Union and State of New Jersey, have invented certain new and useful Improvements in Bolt-Anchors, of which the following is a specification, taken in connection with the accompanying drawings, which form a part of the same.

This invention relates to boat anchors and more particularly to a one piece bolt anchor which is preferably, though not necessarily, formed of some ductile material.

My invention further relates to certain details of construction which will be more fully hereinafter described in the specification and pointed out in the claims.

In the accompanying drawings I have shown an illustrative embodiment of my invention in which the same reference numerals refer to similar parts in the several figures.

Figure 1 is a side elevation of my improved bolt anchor with its coöperating bolt or screw, the support and article supported being shown in sections; Fig. 2 is a vertical section through my improved bolt anchor, the support and article supported being shown in section, and the coöperating bolt or screw in side elevation; Fig. 3 is a section substantially on the line 3—3 of Fig. 2; Fig. 4 is a section substantially on the line 4—4 of Fig. 2; Fig. 5 is a section substantially on the line 5—5 of Fig. 2; Fig. 6 is a view substantially on the line 5—5 of Fig. 2, but showing the position of the parts when in their expanded position; Fig. 7 is a section substantially on the line 4—4 of Fig. 2, but showing the bolt anchor expanded and the bolt in section; Fig. 8 is a section substantially on the line 3—3 after the bolt anchor has been expanded; and Fig. 9 is a view of the axial bore of the bolt anchor.

In the illustrative embodiment of this invention shown in the drawing, 1 is a one-piece bolt anchor formed of any suitable material but preferably of some ductile material, as for example, lead or an alloy. The bolt anchor consists essentially of a hollow body member 2 and one or more tines 3, 3, two being shown in the drawing, though, of course, it is to be understood that a greater number may be used, if desired.

The exterior contour of the bolt anchor, before it is expanded, is substantially cylindrical having transverse ribs 4, 4 on one portion and longitudinal ribs 5 5 on another portion. These longitudinal and transverse ribs may be arranged at various angles to each other, but preferably I arrange them substantially at right angles to each other, as shown.

The longitudinal and transverse projections 5, 5 and 4, 4, respectively, may be formed so as to extend above the cylindrical surface 25 of the bolt anchor 1 to the same extent or may be varied with relation to each other, as may be found convenient or expedient. I preferably extend the longitudinal projections 5, 5 out from the cylindrical surface 25 of the bolt anchor to a greater extent than I do the transverse projections 4, 4. A one piece bolt anchor, therefore, equipped with my invention can be readily inserted in an aperture 6 in a support 7 of masonry, brick, plaster, terra cotta, wood, cement, or any other suitable support until the longitudinally extending ribs 5, 5 contact with the interior surface 8 of the aperture 6. By pressure upon the bolt anchor, or by giving it a light blow with a hammer or other similar tool, the longitudinal ribs 5, 5 will either cut their way into the wall 8 of the aperture 6, if the support 7 is of softer material than the longitudinally extending ribs 5: or, if the support 7 is of harder material than that of the longitudinally extending ribs 5 they will be mashed down, but in either case they will firmly engage the interior surface 8 of the aperture 6 and prevent the bolt anchor from slipping out of the aperture or being forced in by the bolt or screw 9 farther than desired. This is of marked advantage in many locations, particularly where the aperture 6 is driven vertically into a support rather than horizontally, as shown. The longitudinal ribs 5 furthermore serve to hold the bolt anchor and prevent its rotation in the aperture 6 while the bolt or screw 9 is expanding it.

The entire bolt anchor 1 including the transverse ribs 4, 4 and longitudinal ribs 5, 5 are preferably all formed out of some ductile material such as lead or an alloy, thereby forming a one piece ductile bolt anchor in which the longitudinally extending ribs 5, 5 serve to position and prevent relative rotation of the bolt anchor, while the male threads 10 upon the bolt 9 are cutting their own coöperating female threads on the interior of the bolt anchor.

When the bolt anchor has been expanded by the bolt or screw 9 to support any suitable article 11, it is clear that the transverse projections 4, 4 will bite into the surrounding wall 8 of the aperture 6 and will exert the maximum resistance to any strain or pull upon the bolt or screw 9, or the article supported 11, which would tend to withdraw the one piece bolt anchor 1 from the support 7. It is equally clear that the maximum expansion of the one piece bolt anchor will be at or near the ends of the tines 3, 3 which will be the farthest removed from the surface 12 of the support 7 and consequently will prevent any marring or crumbling of the face of the support.

To permit ready expansion of the tines 3, 3 I may form the end of the slot 13 between the tines with an enlarged opening 14 which will permit them to easily swing or bend upon the body member 2 of the bolt anchor.

The longitudinal ribs 5 may be given various shapes. I preferably form them as segments of a circle, their highest point being substantially at 15 and curved or tapered from that point to the points 16 and 16. Preferably the center of the circle of which the projections 5 are segments lies in the axis of the cylindrical bolt anchor. I also preferably provide the axial bore of the bolt anchor with internal longitudinally extending ribs 18, 18 within which the female screw threads can be more readily cut by the male threads of the bolt or screw 9. These internal longitudinal ribs, however, may be omitted without departing from my invention.

Another portion of my invention comprises a one piece bolt anchor with a peculiar axial bore. This axial bore is formed tapering and elliptical in cross section, the minor axes of the different ellipses decreasing in length as the end 20 of the bolt anchor is approached, at which point the smallest ellipse will be formed.

Preferably the interior bore 21 is formed circular in cross section at one end of the bolt anchor, Figs. 5 and 9 and from substantially that point to the end 20 of the bolt anchor it is formed elliptical in cross section, the longest axes of the different ellipses coinciding with the slots 13 between the different tines 3, 3 Figs. 3 and 4. A view of the axial bore is shown in Fig. 9.

With the bolt anchor formed with such an axial bore it is found in practice that the interior surfaces 22, 22 of the tines 3, 3 and which formed originally a portion of the different ellipses, will form a wedge surface and when expanded by the bolt or screw 9, a maximum bearing or engaging surface to coöperate with the bolt or screw 9 and accurately fit the bolt or screw as shown for example in Figs. 7 and 8. If the one piece bolt anchor is formed of ductile material and provided with such an axial bore, the male threads upon the bolt or screw 9 will have a greater wedge and coöperating surface within which to cut their coöperating female screw threads and consequently there will be a firmer and better connection between the bolt anchor and the bolt or screw with which it is used.

While I preferably arrange the longest axes of the different ellipses uniform throughout, decreasing merely the minor axes of the different ellipses, Figs. 3 and 4, I may in some cases decrease both the minor and major axes of the different ellipses.

On the expansion of the bolt anchor each of the ellipses will approach substantially an interrupted circle; the maximum expansion will occur when the sections of the different ellipses reach substantially a true interrupted circle at which time the entire interior bore will be substantially cylindrical and in engagement with the threaded surface of the screw.

Having thus described this invention in connection with several illustrative embodiments thereof to the details of which I do not desire to be limited, what is claimed as new and what it is desired to secure by Letters Patent is set forth in the appended claims.

I claim—

1. A bolt anchor comprising a hollow expansible shield provided with an axial tapering bore elliptical in cross section, the minor axes of the ellipses progressively decreasing in length as the inner end of the anchor is approached, the major axes of the different ellipses remaining substantially constant.

2. A bolt anchor comprising a hollow expansible shield provided with an axial tapering bore circular in cross section at its larger end and substantially from that end to the other end elliptical in cross section, the minor axes of the ellipses progressively decreasing in length as the inner end of the anchor is approached the major axes of the different ellipses remaining substantially constant.

3. A one part ductile bolt anchor comprising an expansible member provided with an axial tapering bore elliptical in cross-section, the minor axes of the ellipses progressively decreasing in length as the inner end of the anchor is approached.

4. A one part ductile bolt anchor comprising an expansible member provided with an axial tapering bore elliptical in cross section, the minor axes of the ellipses progressively decreasing in length as the inner end of the anchor is approached, the major axes of the different ellipses remaining substantially constant.

5. A one part bolt anchor comprising a body member and a plurality of tines, and provided with an axial tapering bore elliptical in cross-section, the major axes substantially coinciding with a line drawn through the openings between the tines and remaining substantially constant, the minor axes of the ellipses progressively, decreasing in length as the inner end of the anchor is approached.

6. A one part ductile bolt anchor comprising a body member and a plurality of tines, and provided with an axial tapering bore elliptical in cross-section, the major axes substantially coinciding with a line drawn through the openings between the tines and remaining substantially constant, the minor axes of the ellipses progressively decreasing in length as the inner end of the anchor is approached.

7. A one part bolt anchor comprising a body member and two tines, and provided with an axial tapering bore elliptical in cross section, the major axes substantially coinciding with a line drawn through the openings between the tines and remaining substantially constant, the minor axes of the ellipses progressively decreasing in length as the inner end of the anchor is approached.

8. A one part ductile bolt anchor comprising a body member, and two tines, and provided with an axial tapering bore elliptical in cross section, the major axes substantially coinciding with a line drawn through the openings between the tines and remaining substantially constant, the minor axes of the ellipses progressively decreasing in length as the inner end of the anchor is approached.

9. A one part bolt anchor having its exterior surface of substantially a uniform diameter throughout and provided with a tapered elliptical interior bore, transverse projections on the forward exterior surface of the one piece bolt anchor and longitudinal projections of slightly greater height upon the rear exterior surface of the one part bolt anchor making that end of a diameter slightly greater than the forward end of the one part bolt anchor, the minor axes of the interior ellipses progressively decreasing in length as the inner end of the anchor is approached, the major axes of the different ellipses remaining constant.

HENRY W. PLEISTER.

Witnesses:
C. M. Lyons,
A. M. Williams.